US012602242B2

(12) United States Patent
Aygar et al.

(10) Patent No.: US 12,602,242 B2
(45) Date of Patent: Apr. 14, 2026

(54) OPTIMIZED SYSTEM DESIGN FOR DEPLOYING AND MANAGING CONTAINERIZED WORKLOADS AT SCALE

(71) Applicant: VMware, Inc., Palo Alto, CA (US)

(72) Inventors: Erol Aygar, Boston, MA (US); Nikhil Deshpande, Palo Alto, CA (US); Benjamin John Corrie, Bellevue, WA (US); George Gregory Hicken, San Francisco, CA (US); Elliott Davis, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 670 days.

(21) Appl. No.: 18/157,196

(22) Filed: Jan. 20, 2023

(65) Prior Publication Data

US 2024/0078127 A1     Mar. 7, 2024

Related U.S. Application Data

(60) Provisional application No. 63/403,267, filed on Sep. 1, 2022.

(51) Int. Cl.
*G06F 9/455*          (2018.01)
*G06F 9/4401*        (2018.01)

(52) U.S. Cl.
CPC ........ *G06F 9/45558* (2013.01); *G06F 9/4406* (2013.01); *G06F 2009/45562* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 10,901,966 B2 * | 1/2021 | Wang | H04L 41/0806 |
| 11,349,933 B1 | 5/2022 | Feng | |
| 2021/0311765 A1 * | 10/2021 | Subramanian | G06F 9/45558 |
| 2023/0185580 A1 * | 6/2023 | Cohen | G06F 9/4416 |
| | | | 713/2 |

* cited by examiner

*Primary Examiner* — Gregory A Kessler
*Assistant Examiner* — Melissa A Headly
(74) *Attorney, Agent, or Firm* — King Intellectual Asset Management

(57) ABSTRACT

An example method of automatically deploying a containerized workload on a hypervisor based device is provided. The method generally includes booting the device running a hypervisor, in response to booting the device: automatically obtaining, by the device, one or more intended state configuration files from a server external to the device, the one or more intended state configuration files defining a control plane configuration for providing services for at least deploying and managing the containerized workload and workload configuration parameters for the containerized workload; deploying a control plane pod configured according to the control plane configuration; deploying one or more worker nodes based on the control plane configuration, and deploying one or more workloads identified by the workload configuration parameters on the one or more worker nodes.

20 Claims, 5 Drawing Sheets

400

Start

402

MANAGE, BY AN INFRASTRUCTURE STATE CONTROLLER IN A CONTROL PLANE, A STATE OF THE CONTROL PLANE

404

MANAGE, BY A RUNTIME CONTROLLER IN AN EXTENSION PLANE, A STATE OF ONE OR MORE WORKER NODE VIRTUAL MACHINES

OPTIMIZED SYSTEM DESIGN FOR DEPLOYING AND MANAGING CONTAINERIZED WORKLOADS AT SCALE

CROSS-REFERENCE TO RELATED APPLICATIONS

This application claims priority to U.S. Provisional Patent Application No. 63/403,267, filed Sep. 1, 2022, entitled "OPTIMIZED SYSTEM DESIGN FOR DEPLOYING AND MANAGING CONTAINERIZED WORKLOADS AT SCALE," and assigned to the assignee hereof, the contents of which are hereby incorporated by reference in its entirety.

BACKGROUND

Modern applications are applications designed to take advantage of the benefits of modern computing platforms and infrastructure. For example, modern applications can be deployed in a multi-cloud or hybrid cloud fashion, such as, consuming both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that access a shared operating system (OS) kernel. Containerized applications, also referred to as containerized workloads, can include a collection of one or more related applications packaged into one or more groups of containers, referred to as pods, that can be deployed based on the context defined in a manifest for the containerized workloads. Each pod may include one or more containers.

Containerized workloads run on a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing.

Kubernetes® (K8S)® software is an example open-source container orchestration platform that automates the operation of such containerized workloads. Kubernetes software allows for distributed computing by running the pods of containerized workloads on a cluster of interconnected worker nodes (e.g., VMs or physical machines) that may scale vertically and/or horizontally over hybrid cloud topology.

While containers are the building-blocks that enable a scalable environment, containers are not the only part of the software stack that needs to scale. In particular, tools used to instantiate, manage, monitor, and/or secure containers may also need to be able to scale as seamlessly as the containers. In other words, scalability of virtualization software and architecture for deploying and managing containerized workloads may also affect an ability of the environment to handle an increased or expanding workload.

For example, a software-defined data center (SDDC) includes clusters of physical servers (e.g., hosts) that are virtualized and managed by virtualization management servers. A host can include a virtualization layer (e.g., a hypervisor) that provides a software abstraction of the hardware platform of the physical server (e.g., central processing unit (CPU), random access memory (RAM), storage, network interface card (MC), etc.) to allow multiple virtual computing instances (e.g., such as VMs) to run thereon. A control plane for each cluster of hosts may support the deployment and management of applications (or services) on the cluster using containers. In some cases, the control plane deploys applications as pods of containers running on one or more worker nodes. Accordingly, scalability of the environment may also depend on the operational effort required to initialize the control plane and/or worker nodes for container deployment, as well as an ability of the control plane to determine a context defined in a manifest for instantiation of workloads in these containers.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method of automatically deploying a containerized workload on a hypervisor based device. The method generally includes booting the device running a hypervisor, in response to booting the device: automatically obtaining, by the device, one or more intended state configuration files from a server external to the device, the one or more intended state configuration files defining a control plane configuration for providing services for at least deploying and managing the containerized workload and workload configuration parameters for the containerized workload; deploying a control plane pod configured according to the control plane configuration; deploying one or more worker nodes based on the control plane configuration, and deploying one or more workloads identified by the workload configuration parameters on the one or more worker nodes.

Further embodiments include a non-transitory computer-readable storage medium comprising instructions that cause a computer system to carry out the above methods, as well as a computer system configured to carry out the above methods.

DETAILED DESCRIPTION

Figure 1:
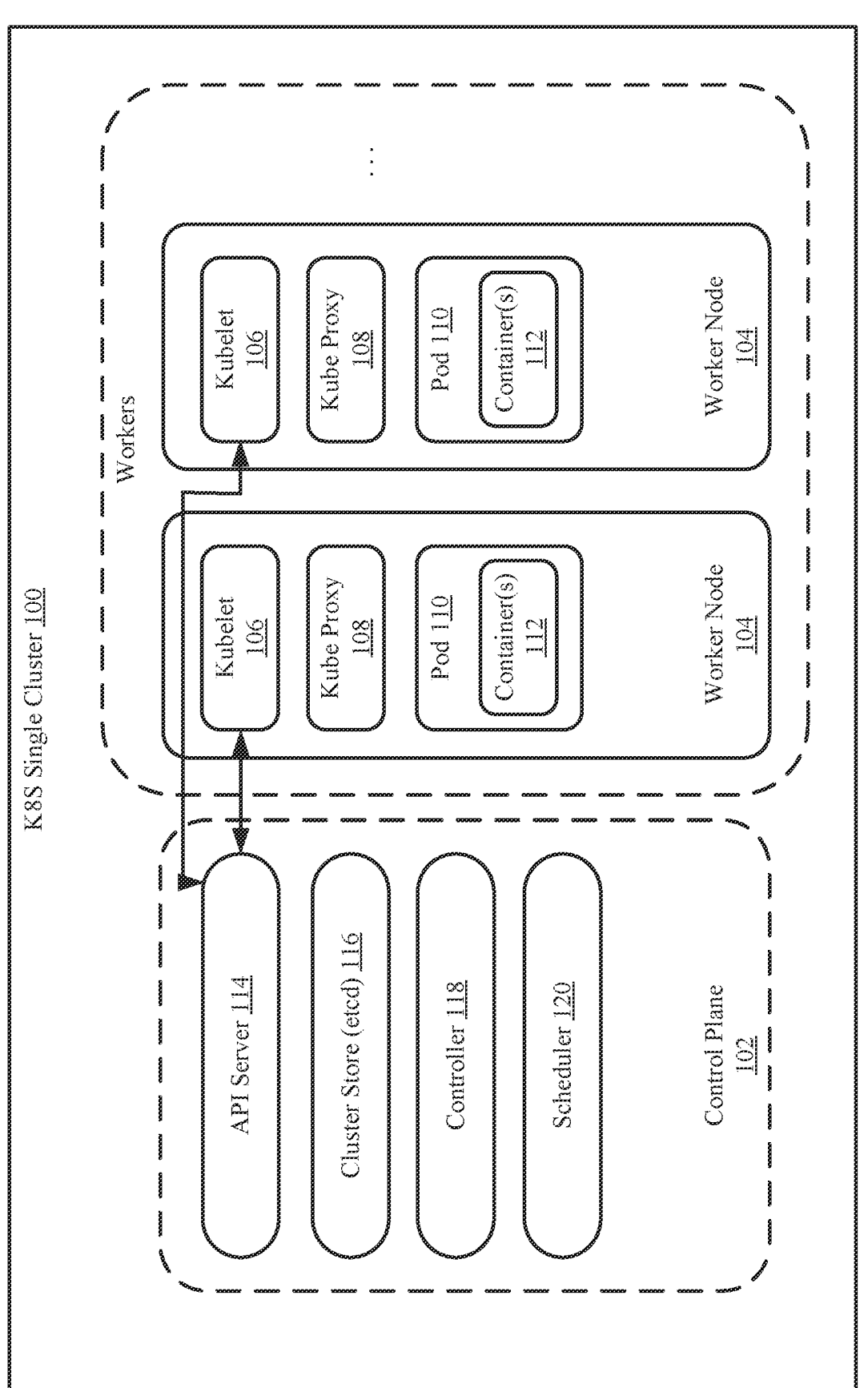
FIG. 1 is a block diagram of an exemplary container-based cluster according to aspects of the present disclosure.

Aspects of the present disclosure provide an auto-deployment system for automatically deploying and/or managing containerized workloads at scale. In certain aspects, the containerized workloads may be distributed. Automated deployment refers to the automation of steps, processes, and/or activities that are necessary to make a system and/or update available to its intended users. As described in more detail herein, automation of much of the operational effort required to set up and/or manage a system capable of supporting containerized workloads is based on an ability of the system to access one or more intended state configuration files made up of one or more manifests that declare intended system infrastructure and workloads to be deployed in the system. In certain aspects, the manifests are JavaScript Object Notation (JSON) and/or YAML files.

For example, deployment of the system to a device may be triggered by a user booting a device, such as from a USB drive, flash drive, SD-RAM card, preboot execution environment (PXE), etc. The device may execute an initialization script that causes a hypervisor to be installed on the device. The hypervisor may be a type-1 hypervisor that includes and integrates operating system (OS) components, such as a kernel, security management, file, process, memory, and/or input/output (I/O) device management.

According to aspects described herein, the installed hypervisor may include an infrastructure supervisor (infravisor) layer that provides a runtime for services for a cluster of hosts. In particular, the infravisor layer provides a cluster runtime for virtualization services and management, as further described herein. For example, the infravisor layer may be configured to provide a control plane service for managing the cluster of hosts, including configuring the cluster of hosts to run according to a defined intended state.

For example, a control plane and one or more infravisor pods may be instantiated on the infravisor layer to provide a service for deploying and/or managing containerized workloads. The control plane may be created to deploy and automatically manage clusters of containerized applications such that they align with their intended states as defined in one or more intended state configuration files. Accordingly, when deployed, the control plane may be configured to (1) determine one or more intended infrastructure configuration parameters by accessing one or more of the intended state configuration files at an accessible external datastore and (2) build the infrastructure based on these determined parameters. As mentioned, the intended infrastructure configuration parameters may declare infrastructure necessary for the deployment of one or more applications, for example, a number of worker node virtual machines (VMs) necessary for deployment inside the infravisor layer, virtual network configurations, storage configurations, etc. Though certain aspects are described herein with respect to VMs as worker nodes, other suitable types of VCIs, and/or hardware nodes may similarly be used as worker nodes.

Further, in some cases, building the infrastructure involves deploying one or more infravisor pods on the infravisor layer. At least one of the pods may be used to (1) determine one or more workloads to be instantiated on the created infrastructure, by accessing one or more of the intended state configuration files at an accessible external datastore and (2) instantiate these workloads. In some cases, these workloads are instantiated on one or more worker node VMs running on the hypervisor.

As such, when booted, the system described herein is designed to automatically pull intended configuration parameters (e.g., from an external datastore) and apply these parameters to automatically configure an underlying virtualization infrastructure of the system and execute containerized workloads on the configured infrastructure. Accordingly, human interaction and/or intervention with the system may not be necessary, thereby resulting in a more streamlined deployment of containerized workloads which may help to decrease errors, increase speed of delivery, boost quality, minimize costs, and overall, simplify the deployment process. Further, the auto-deployed system described herein may be able to scale. For example, introducing automation into deployment of the containerized workloads and underlying infrastructures allows for a same system to be instantiated multiple times, and/or a much larger system (including multiple clusters, containers, applications, etc.) to be instantiated in the same way (e.g., without human intervention).

In certain aspects, the one or more intended state configuration files are stored in a repository on a version control system. One example version control system that may be configured and used in aspects described herein is GitHub made commercially available by GitHub, Inc. GitHub is a git repository hosting service which provides version control software capable of managing and tracking changes to software code. Accordingly, intended configuration parameters stored in the one or more intended state configuration files may be easily updated and tracked when stored on the version control system. Any updates made to the intended state configuration files may be automatically pulled and used by the system for adjustment to help guarantee consistent realization of the intended state defined by the intended state configuration files.

In certain aspects, the one or more intended state configuration files include at least two intended state configuration files. A first file (referred to as the "infrastructure manifest") may include one or more intended infrastructure configuration parameters, while the second file (referred to as the "workload manifest") may include one or more intended workload definitions. By keeping the infrastructure manifest separate from the workload manifest, patching (e.g., identifying, acquiring, testing and installing patches, or code changes, that are intended to resolve functionality issues, improve security, and/or add features) of these manifests may be less complex and easier to manage, as changes to infrastructure configuration parameters are independent of changes to intended workload definitions due to the file separation. It should be noted that any number of intended state configuration files may be used, such as a single file including both intended infrastructure configuration parameters and intended workload definitions.

According to aspects described herein, the control plane deployed to automatically deploy and manage containerized workloads may be isolated from such workloads. In particular, in terms of infrastructure, the control plane may be isolated from a worker plane where worker node VMs are instantiated for running the containerized workloads. Further, a state of the control plane may be managed separate from a state of the worker node VMs in the work plane. For example, the state of the control plane is managed by a control plane pod within the control plane. The state of the worker node VMs in the worker plane are managed by a worker pod in the extension plane, which is separated from the control plane. Thus, the system described herein offers logical separation of the state of the control plane from the state of the worker node VMs, as well as separate management of each of the states. Isolation of the control plane from the workloads may result in improved redundancy, security, and/or scalability.

Figure 2:
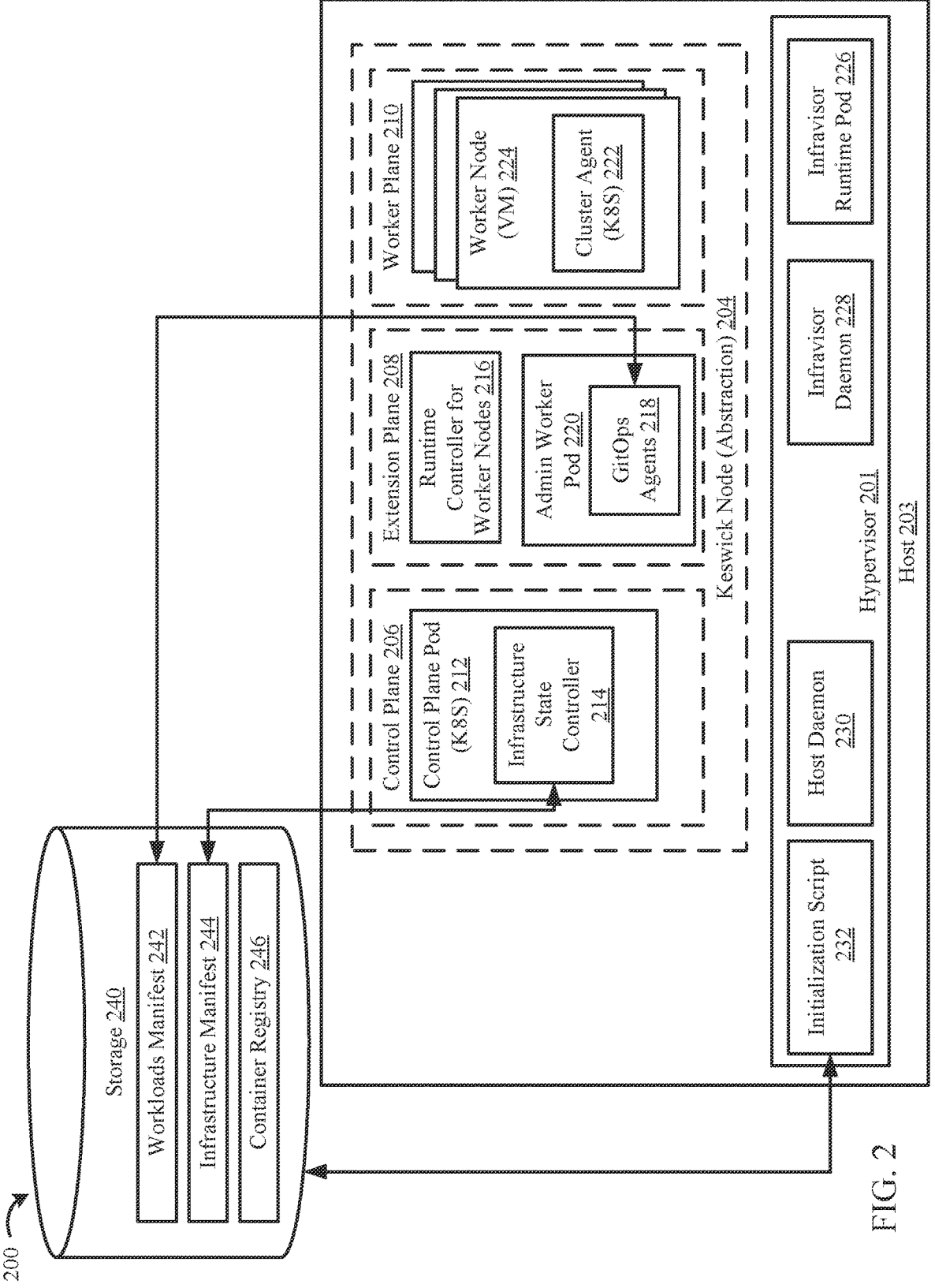
FIG. 2 is a block diagram of an example system for deploying and managing distributed containerized workloads at scale according to aspects of the present disclosure.

Turning now to FIG. 1, a block diagram of an exemplary container-based cluster is illustrated. It should be noted that the block diagram of FIG. 1 is a logical representation of a container-based cluster, and does not show where the various components are implemented and run on physical systems. FIG. 2 provides an example system for implementing and running a container-based cluster of FIG. 1. While the example container-based cluster shown in FIG. 1 is a Kubernetes cluster 100, in other examples, the container-based cluster may be another type of container-based cluster based on container technology, such as Docker® clusters.

When Kubernetes is used to deploy applications, a cluster, such as K8S cluster 100 illustrated in FIG. 1, is formed from a combination of worker nodes 104 and a control plane 102. Worker nodes 104 are managed by control plane 102, which manages the computation, storage, and memory resources to run all worker nodes 104.

Each worker node 104, or worker compute machine, includes a kubelet 106, which is an agent that ensures that one or more pods 110 run in the worker node 104 according to a defined specification for the pods, such as defined in a workload definition manifest. Each pod 110 may include one or more containers 112. The worker nodes 104 can be used to execute various applications and software processes using container 112. Further each worker node 104 includes a kube proxy 108. Kube proxy 108 is a Kubernetes network proxy that maintains network rules on worker nodes 104. These network rules allow for network communication to pods 110 from network sessions inside and/or outside of K8S cluster 100.

Control plane 102 includes components such as an application programming interface (API) server 114, a cluster store (etcd) 116, a controller 118, and a scheduler 120. Control plane 102's components make global decisions about K8S cluster 100 (e.g., scheduling), as well as detect and respond to cluster events (e.g., starting up a new pod 110 when a workload deployment's replicas field is unsatisfied).

API server 114 operates as a gateway to K8S cluster 100. As such, a command line interface, web user interface, users, and/or services communicate with K8S cluster 100 through API server 114. One example of a Kubernetes API server 114 is kube-apiserver. kube-apiserver is designed to scale horizontally—that is, this component scales by deploying more instances. Several instances of kube-apiserver may be run, and traffic may be balanced between those instances.

Cluster store (etcd) 116 is a data store, such as a consistent and highly-available key value store, used as a backing store for all K8S cluster 100 data.

Controller 118 is a control plane 102 component that runs and manages controller processes in K8S cluster 100. For example, control plane 102 may have (e.g., four) control loops called controller processes, which watch the state of cluster 100 and try to modify the current state of cluster 100 to match a intended state of cluster 100. In certain aspects, controller processes of controller 118 are configured to monitor external storage for changes to the state of cluster 100.

Scheduler 120 is a control plane 102 component configured to allocate new pods 110 to worker nodes 104. Additionally, scheduler 118 may be configured to distribute resources and/or workloads across worker nodes 104. Resources may refer to processor resources, memory resources, networking resources, and/or the like. Schedule 118 may watch worker nodes 104 for how well each worker node 104 is handling their workload, and match available resources to the worker nodes 104. Scheduler 118 may then schedule newly created containers 112 to one or more of the worker nodes 104.

In other words, control plane 102 manages and controls every component of the cluster 100. Control plane 102 handles most, if not all, operations within cluster 100, and its components define and control cluster 100's configuration and state data. Control plane 102 configures and runs the deployment, management, and maintenance of the containerized applications. As such, ensuring high availability of the control plane may be critical to container deployment and management. High availability is a characteristic of a component or system that is capable of operating continuously without failing.

Accordingly, in certain aspects, control plane 102 may operate as a high availability (HA) control plane. Additional details of HA control planes are disclosed in U.S. Application Ser. No. 63/347,815, filed on Jun. 1, 2022, and titled "AUTONOMOUS CLUSTERS IN A VIRTUALIZATION COMPUTING ENVIRONMENT," which is hereby incorporated by reference herein in its entirety.

As mentioned, while container orchestration platforms, such as Kubernetes, provide automation to deploy and run clusters of containerized applications (e.g., such as K8S cluster 100 illustrated in FIG. 1), thereby allowing for easy scalability of containers based on application requirements, containers are not the only part of the software stack that needs to be automated for scaling. For example, deployment of a control plane (e.g., such as control plane 102 illustrated in FIG. 1) may be necessary for the deployment and management of such containerized workloads.

Accordingly, as discussed, aspects of the present disclosure provide a system for fully automatically deploying and/or managing distributed containerized workloads at scale. Architecture of the auto-deployed system described herein includes an improved system designed for deploying and managing distributed containerized workloads at scale. In particular, the system described herein includes one or more components configured to automatically configure and deploy a control plane for managing containerized workloads. The system further includes one or more components to determine a number of worker nodes needed for deployment of intended workloads, deploy the determined number of worker nodes, and instantiate the intended workloads on the deployed worker nodes. Further, the system design described herein offers physical separation of the state of a control plane used to manage deployed workloads from the state of worker nodes where the workloads are deployed.

FIG. 2 is a block diagram of an auto-deployed system 200 for deploying and managing distributed containerized workloads at scale according to aspects of the present disclosure. The architecture of system 200 described in FIG. 2 may allow for implementation of a container-based cluster on a hypervisor. For example, a logical construct of K8S cluster 100 illustrated in FIG. 1 may be implemented by the architecture described below with reference to FIG. 2. Further, such architecture may bring along with it a new management model, as described in more detail below.

As mentioned, a hypervisor is a type of virtualization software that supports the creation and management of virtual endpoints by separating a physical machine's software from its hardware. In other words, hypervisors translate requests between physical and virtual resources, thereby making virtualization possible. When a hypervisor is installed directly on the hardware of a physical machine, as opposed to on top of an operating system (OS) of the machine, the hypervisor is referred to as bare-metal hypervisor. In certain aspects, hypervisor 201 illustrated in FIG. 2 is a bare-metal hypervisor. As shown, a host 203 runs hypervisor 201. Host 203 is a physical computing device, such as a server-grade computer, that includes hardware components, such as a memory, processor, storage, networking card, and/or the like, for running components described herein.

In certain aspects, a user interface (not shown) may be provided to enable users to interact with hypervisor 201, such as to check on system status, update configuration, etc. The user interface may be accessible by directly accessing host 203, or by accessing host 203 over a network, such as via machine web browser or API client. For example, hypervisor 201 may include a host daemon 230 running as a background process, which in part allows connection to hypervisor 201 for monitoring hypervisor 201.

In certain aspects, hypervisor 201 is a multi-layer entity, where each layer is provided a different level of privilege. In particular, hypervisor 201 architecture may include underlying OS features, referred to as a kernel, and processes that run on top of the kernel. The kernel may be a microkernel that provides functions such as process creation, process control, process threads, signals, file system, etc. A process running on or above the kernel may be referred to as a "user world" process. A user world process may run in a limited environment. A privilege level of the kernel may be greater than a privilege level of a user world process.

Hypervisor 201, as part of an infravisor layer, may include an infravisor daemon 228 running as a background process. In certain aspects, infravisor daemon 228 is an infravisor watchdog running on hypervisor 201. The infravisor daemon 228 is configured to monitor individual infravisor services (e.g., including an infravisor runtime pod 226, described in detail below) running in a cluster of hosts to help guarantee that a minimum number of individual services are continuously running in the cluster. In certain aspects, infravisor daemon 228 monitors an API server (e.g., such as API server 114 illustrated in FIG. 1) to determine whether a minimum number of individual services are running.

Hypervisor 201, as part of an infravisor layer, may further include an infravisor runtime pod 226, which may be a pod of containers running on the hypervisor 201 that execute control plane entities, such as API server 114, cluster store (etcd) 116, controller 118, and scheduler 120 illustrated in FIG. 1, for a cluster of hosts. These components may run as separate or consolidated pods for isolation or footprint reduction, respectively. The infravisor runtime pod 226 may access the cluster store (etcd) 116 to store a cluster's runtime state. In certain aspects, the infravisor runtime pod 226 is bootstrapped on a host in a cluster when the infravisor daemon 228 detects the absence of a functional infravisor runtime pod. It should be noted that such control plane functionality provided by infravisor runtime pod 226 may be separate from the control plane 206 described herein for worker nodes. In particular, while infravisor runtime pod 226 and a control plane pod 212 of control plane 206 may execute similar control plane/runtime entities, in certain aspects, the infravisor runtime pod 226 runs in a higher privilege level than control plane pod 212 of control plane 206. Further, while infravisor runtime pod 226 may manage at least part of the lifecycle of pods or services for running containerized workloads, control plane pod 212 of control plane 206 manages the runtime state of such containerized workloads, and the infrastructure necessary for implementation.

Hypervisor 201 provides resources of host 203 to run one or more pods or services, collectively referred to as a Keswick node 204, which is a logical abstraction of the one or more pods or services. (The term, "Keswick" is an arbitrary name given to the abstraction for purpose of easy reference.) The pods and services of the Keswick node 204 are logically separated by function into a control plane 206, an extension plane 208, and a worker plane 210, which are used to provide services for deploying and/or managing containerized workloads.

Control plane 206 includes a control plane pod 212, which may be a pod of containers running on the hypervisor 201 that execute control plane entities, such as API server 114, cluster store (etcd) 116, controller 118, and scheduler 120 illustrated in FIG. 1, for worker nodes 224. The control plane pod 212 runs an infrastructure state controller 214 configured to manage the state of control plane 206, such as a number of worker nodes 224 to run, networking configuration of such worker nodes 224, etc. In certain aspects, control plane 206 is configured based on infrastructure manifest 244 stored in storage 240.

Infrastructure manifest 244 provides information about intended system infrastructure to be deployed on host 203. For example, infrastructure manifest 244 may define the infrastructure on which containerized workloads are expected to run. This may include information about a number of worker VMs 224 to instantiate, assignment of hardware resources to worker VMs 224, software configuration (e.g., a version of Kubernetes an application/workload uses), and/or network infrastructure (e.g., a software defined network). As an illustrative example, the infrastructure manifest 244 may indicate a number of worker node VMs to deploy on hypervisor 201 and, in some cases, images to use for instantiating each of these worker node VMs. The number of worker node VMs indicated in infrastructure manifest 244 may be a number of worker node VMs needed to run particular workloads defined in a workloads manifest 242.

In certain aspects, infrastructure manifest 244 is included in an intended state configuration file. In certain aspects, the intended state configuration file may include one or more other manifests (e.g., such as workloads manifest 242). The intended state configuration file may be stored in storage 240, which may be an external storage that is accessible by hypervisor 201. Storage 240 may further be accessible by infrastructure state controller 214 of control plane 206 after the control plane is instantiated, such as to monitor for updates to the infrastructure manifest 244 and automatically update the configuration of control plane 206, accordingly. In certain aspects, storage 240 is a repository on a version control system. As mentioned previously, one example version control system that may be configured and used in aspects described herein is GitHub made commercially available by GitHub, Inc.

As such, hypervisor 201 may be configured to pull information from infrastructure manifest 244 and use this information to instantiate and configure control plane 206, such as by instantiating and configuring control plane pod 212. In certain aspects, this involves instantiating worker plane 210 by deploying one or more worker node VMs 224 in worker plane 210. A number of worker node VMs 224 deployed in worker plane 210 may be based, at least in part, on a number of work node VMs indicated for deployment in infrastructure manifest 244.

Infrastructure state controller 214 on control plane 206 is configured to manage a state of the infrastructure. In other words, infrastructure state controller 214 accepts an "intended state" (also referred to as "desired state" or "declared state") from a human operator (e.g., via infrastructure manifest 244), observes the state of the infrastructure, and dynamically configures the infrastructure such that the infrastructure matches the "intended state." Accordingly, infrastructure state controller 214 may also be configured to interact with infrastructure manifest 244 stored in storage 240.

Further, in certain aspects, infrastructure state controller 214 monitors storage 240 for changes/updates to infrastructure manifest 244. Infrastructure state controller 214 may be configured to dynamically update the infrastructure such that the infrastructure matches a new "intended state" defined by infrastructure manifest 244, for example, when infrastructure state controller 214 determines infrastructure manifest 244 has been updated.

Worker node VMs 224 deployed in worker plane 210 are compute resources that use software to run programs and deploy applications/workloads. More specifically, worker node VMs 224 may be used to deploy containerized workloads on hypervisor 201. Worker node VMs 224 deployed in worker plane 210 may each include a cluster agent 222. A cluster agent 222 may be a container or a pod within a worker node VM 224. In certain aspects, cluster agent 222 is configured to monitor the health of a container-based cluster supported via worker node VM 224. Further, in certain aspects, cluster agent 222 is configured to collect metrics and metadata for a container-based cluster deployed on worker node VM 224, including each node and namespace down to the container level. As shown in FIG. 2, worker plane 210 is isolated from control plane 206; thus, worker node VMs 224 and their corresponding cluster agents 222 are similarly isolated from control plane 206. Worker plane 210 describes resources managed by hypervisor 201 dedicated for running VMs. These resources may be distinct from resources used to run control plane 206 and extension plane 208.

Extension plane 208 includes a runtime controller for worker nodes 216 and an admin worker pod 220 which includes GitOps agents 218. In certain aspects, GitOps agents 218 are configured to interact with workloads manifest 242 stored in storage 240.

Workloads manifest 242 provides information about intended workloads to be deployed in hypervisor 201. For example, workloads manifest 242 may outline details of one or more workloads to be deployed in worker node VMs 224 in worker plane 210 on hypervisor 201. In particular, in certain aspects, workloads manifest 242 includes an identifier of a binary to be loaded. In certain aspects, workloads manifest 242 includes information about resources to be deployed, workload parameters associated with these resources, and/or protected resources for one or more workloads. The workload parameters may include a workload name, a workload ID, a service name, an associated organization ID, and/or the like.

In certain aspects, workloads manifest 242 is included in an intended state configuration file. In some cases, the intended state configuration file may include one or more other manifests (e.g., such as infrastructure manifest 244). The intended state configuration file may be stored in storage 240 which is external storage that is accessible by GitOps agents 218.

As such, GitOps agents 218 may be configured to pull information from workloads manifest 242 and use this information to instantiate workloads on worker node VMs 224 running in worker plane 210 (e.g., previously deployed by control plane 206).

Runtime controller for worker nodes 216 is configured to manage a state of the worker node VMs 224. In other words, runtime controller for worker nodes 216 accepts a "intended state" (also referred to as "intended stated" or "declared state") from a human operator (e.g., via workloads manifest 242), observes the state of the worker node VMs 224, and dynamically configures the worker node VMs 224 such that their behavior matches the "intended state."

Further, in certain aspects, runtime controller for worker nodes 216 monitors storage 240 for changes/updates to workloads manifest 242. Runtime controller for worker nodes 216 may be configured to dynamically update the state of the worker node VMs 224 to match a new "intended state" defined by workloads manifest 244, for example, when runtime controller for work nodes 216 determines workloads manifest 244 has been updated.

As mentioned, in certain aspects, privilege becomes diluted when moving from bottom to top layers of hypervisor 201. As such, in certain aspects, the infravisor layer of hypervisor 201 is at a lower, more privileged level of hypervisor 201, while control plane 206 and extension plane 208 are at a lesser-privileged level in hypervisor 201. Additionally, the worker node VMs 224 running in worker plane 210 may be on top of hypervisor 201, as this is where the deployed workloads are expected to run.

Further, in addition or alternative to different privilege levels, defined management levels may be assigned to different entities. For example, in certain aspects, worker node VMs 224 are managed by control plane pod 212 of control plane 206, and the control plane pod 212 is managed by the infravisor layer of hypervisor 201.

It should be noted that Keswick Node 204 is a logical abstraction that represents the control plane 206, extension plane 208, and worker plane 210. Though certain example implementations are described herein of how each of the control plane 206, extension plane 208, and worker plane 210 are implemented (e.g., as pods, VMs, etc.) and where they run (e.g., in hypervisor 201, on top of hypervisor 201, etc.), it should be noted that other implementations may be possible, such as having certain components run in different privilege levels, layers, within hypervisor 201, outside hypervisor 201, etc.

Further, as shown in FIG. 2, hypervisor 201 includes an initialization script 232. Initialization script 232 is a sequence of instructions that are interpreted or carried out during startup of hypervisor 201. Initialization script 232 helps to automate the deployment of hypervisor 201 and Keswick node 204. In other words, initialization script 232 helps to automate and streamline the deployment of contained zed workloads on hypervisor 201.

In certain aspects, initialization script 232 may interact with container registry 246 available in storage 240. Container registry 246 may be a repository, or a collection of repositories, used to store and access container images. Although container registry 246 is illustrated as being stored in storage 240 with workloads manifest 242 and infrastructure manifest 244, in certain other aspects, container registry may be stored separately from one or both of these manifests.

Figure 3:
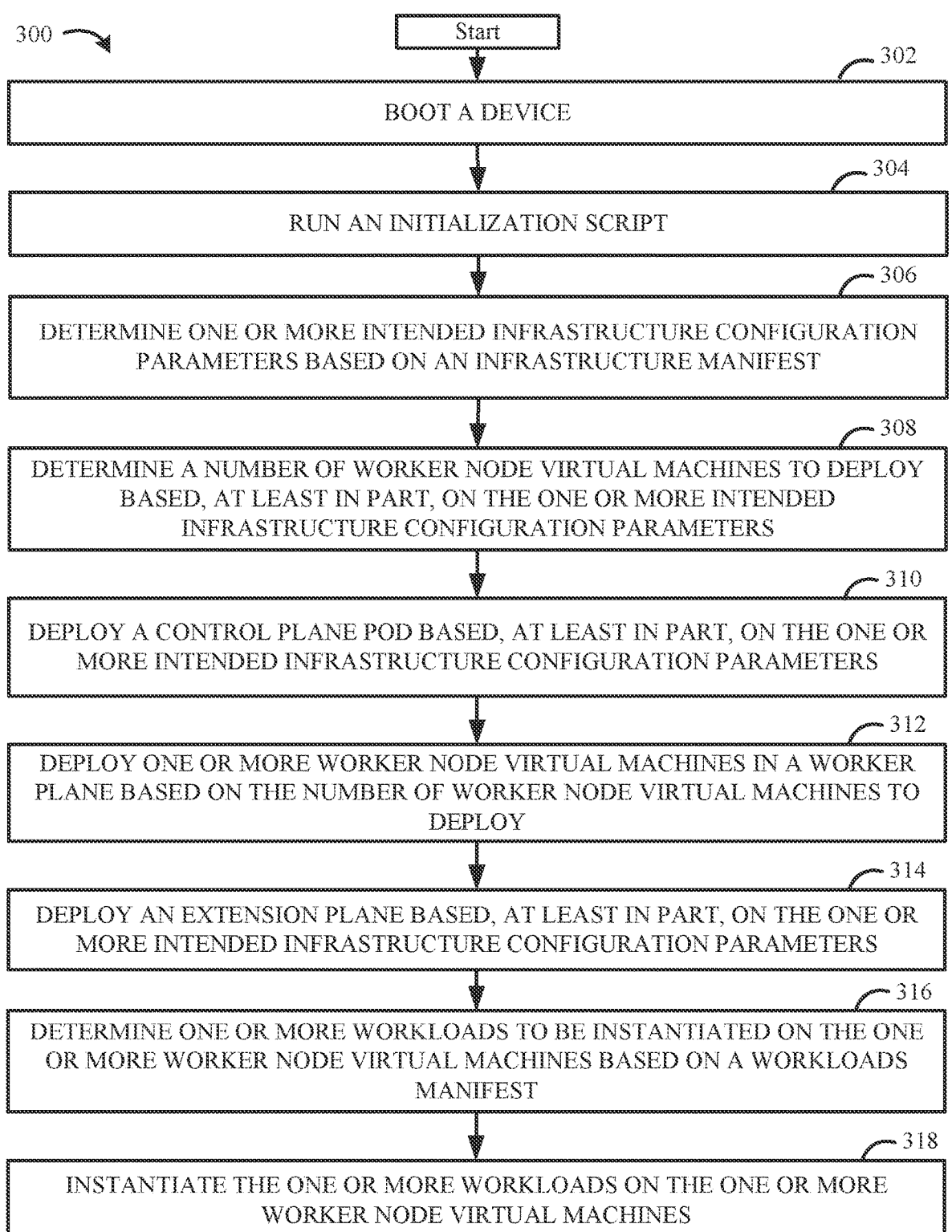
FIG. 3 is a flow diagram illustrating example operations for automatically deploying containerized workloads according to aspects of the present disclosure.

FIG. 3 is a flow diagram illustrating example operations 300 for automatically deploying containerized workloads according to aspects of the present disclosure. In particular, operations 300 provide a method which eliminates the need for human intervention when deploying containerized workloads, for example, on one or more worker node VMs deployed on a hypervisor. Operations 300 may be performed by components illustrated in FIG. 2.

As illustrated, operations 300 begin at block 302, by booting a device, such as host 203. The device may be booted from a universal serial bus (USB) thumb drive, a synchronous dynamic random access memory (SD-RAM) car, a preboot execution environment (PXE), or the like to load hypervisor 201.

At block 304, operations 300 proceed with running an initialization script. For example, instructions included in initialization script 232 illustrated in FIG. 2 are executed to initiate automatic deployment of containerized workloads and their necessary infrastructure on the device.

At block 306, operations 300 proceed with determining one or more intended infrastructure configuration parameters based on infrastructure manifest 244. For example, the hypervisor 201, based on instructions in initialization script 232, pulls information from infrastructure manifest 244 stored on storage 240 to configure control plane 206, as well as other infrastructure necessary to run containerized workloads on the device.

At block 308, operations 300 proceed with determining a number of worker node VMs to deploy based, at least in part, on the one or more intended infrastructure configuration parameters. In particular, the infrastructure state controller 214 may indicate a number of worker node VMs 224 needed to run particular workloads.

At block 310, operations 300 proceed with deploying the control plane pod 212. In certain aspects, control plane pod 212 is deployed based, at least in part, on the one or more intended infrastructure configuration parameters. As such, control plane pod 212 is brought up in a configured state. For example, as illustrated in FIG. 2, control plane pod 212 having infrastructure state controller 214 for managing a state of the infrastructure is deployed. In certain other aspects, control plane pod 212 is brought up in a default state and then later configured.

At block 312, operations 300 proceed with deploying one or more worker node VMs 224 in worker plane 210 based on the determined number of worker node VMs 224 to deploy.

At block 314, operations 300 proceed with deploying an extension plane based, at least in part, on the one or more intended infrastructure configuration parameters. For example, as illustrated in FIG. 2, extension plane 208 including a runtime controller for worker nodes 216, an admin worker pod 220, and GitOps agents 218 may be deployed.

At block 316, operations 300 proceed with determining one or more workloads to be instantiated on the one or more work node VMs 224 based on workloads manifest 242. For example, GitOps agents 218 pull information from workloads manifest 242 stored on storage 240.

At block 318, operations 300 proceed with instantiating the one or more workloads on the one or more work node VMs 224.

Subsequent to block 320, the deployed system may be enabled to run and manage containerized workloads. In particular, the deployed system may manage a state of the infrastructure such that it aligns with an intended state of the infrastructure. Further, the deployed system may manage the containerized workloads such that they align with their intended states. Management of each of these states may be separated.

Figure 4:
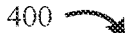
FIG. 4 is a flow diagram illustrating example operations for managing different states of a deployed system according to aspects of the present disclosure.
Figure 4:
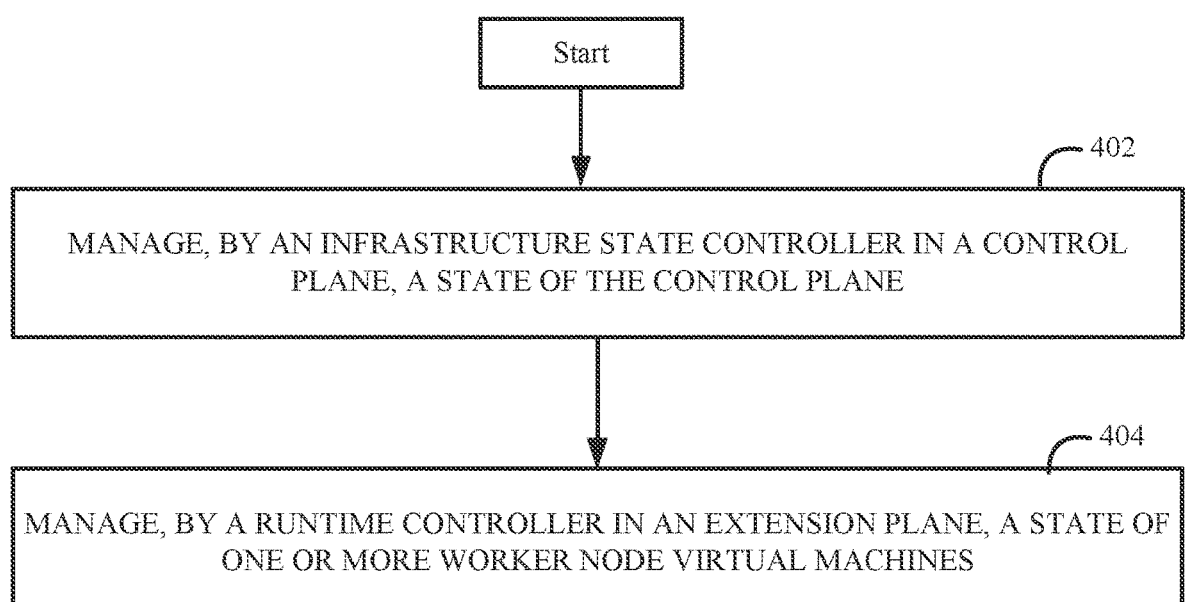

FIG. 4 is a flow diagram illustrating example operations 400 for managing different states of a deployed system according to aspects of the present disclosure. Operations 400 may be performed by one or more components illustrated in FIG. 2, and more specifically, infrastructure state controller 214 in control plane 206 and runtime controller for worker nodes 216 in extension plane 208.

As illustrated, operations 400 include, at block 402, an infrastructure state controller (e.g., infrastructure state controller 214) in the control plane managing a state of the control plane. At block 404, operations 400 further include a runtime controller (e.g., runtime controller for worker nodes 216) in the extension plane managing a state of one or more worker node VMs.

Although operations of block 404 are illustrated as occurring subsequent to operations of block 402, in certain aspects, operations of blocks 402 and 404 may be performed concurrently such that the state of the entire system (e.g., including both the state of the infrastructure/control plane and the state of the worker node VMs) is continuously being managed.

Figure 5:
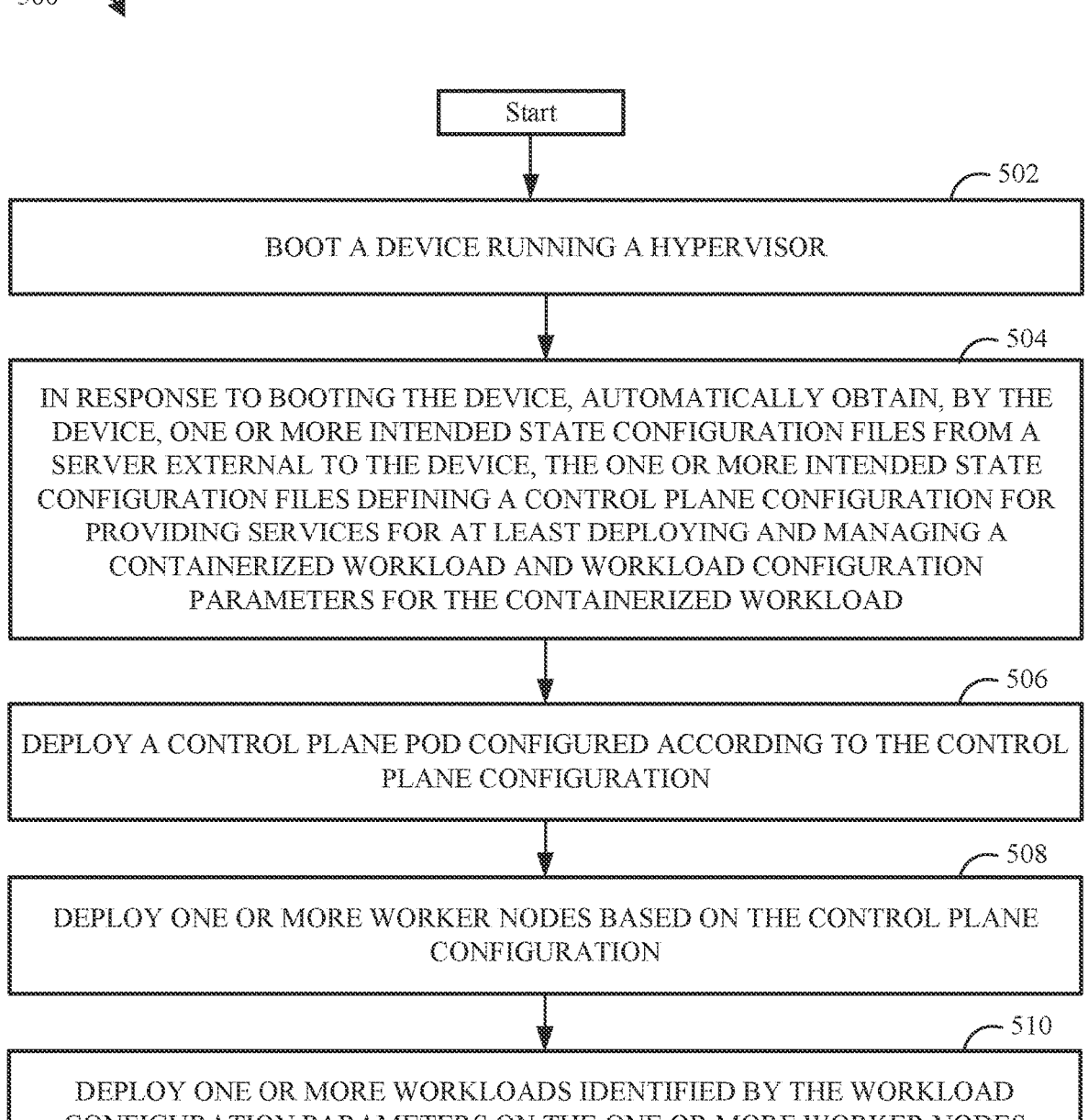
FIG. 5 shows a flow diagram depicting a method of automatically deploying a containerized workload on a hypervisor based device according to an embodiment.

FIG. 5 is a flow diagram illustrating example operations 500 for automatically deploying a containerized workload on a hypervisor based device according to aspects of the present disclosure.

As illustrated, operations 500 begin at block 502, by booting the device running a hypervisor.

At block 504, operations 500 proceed with, in response to booting the device, automatically obtaining, by the device, one or more intended state configuration files from a server external to the device, the one or more intended state configuration files defining a control plane configuration for providing services for at least deploying and managing the containerized workload and workload configuration parameters for the containerized workload. In certain aspects, the control plane configuration for providing services for deploying and managing the containerized workload is a control plane configuration for Keswick Node 204 illustrated in FIG. 2.

At block 506, operations 500 proceed with deploying a control plane pod configured according to the control plane configuration.

At block 508, operations 500 proceed with deploying one or more worker nodes based on the control plane configuration.

At block 510, operations 500 proceed with deploying one or more workloads identified by the workload configuration parameters on the one or more worker nodes.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of automatically deploying a containerized workload on a hypervisor based device, the method comprising:
   booting the device running a hypervisor;
   in response to booting the device:
      automatically obtaining, by the device, one or more intended state configuration files from a server external to the device, the one or more intended state configuration files defining a control plane configuration for providing services for at least deploying and managing the containerized workload and workload configuration parameters for the containerized workload;
      deploying, in a control plane, a control plane pod configured according to the control plane configuration;
      deploying one or more worker nodes based on the control plane configuration;
      deploying an infrastructure controller configured to manage a state of the control plane; and
      deploying a runtime controller for the one or more worker nodes configured to manage a state of the one or more worker nodes, wherein:

the infrastructure controller is deployed in the control plane;
      the runtime controller is deployed in an extension plane; and
      the control plane and the extension plane are logically separated planes; and
   deploying one or more workloads identified by the workload configuration parameters on the one or more worker nodes.

2. The method of claim 1, wherein:
the one or more worker nodes are deployed in a worker plane; and
the control plane and the worker plane are logically separated planes.

3. The method of claim 2, wherein the infrastructure controller is configured to manage the state of the control plane based on:
   monitoring for changes to the control plane configuration; and
   updating the state of the control plane based on detecting a change to the control plane configuration when monitoring for the changes to the control plane configuration.

4. The method of claim 2, wherein the runtime controller is configured to manage the state of the one or more worker nodes based on:
   monitoring for changes to the workload configuration parameters; and
   updating the state of the one or more worker nodes based on detecting a change to the workload configuration parameters when monitoring for the changes to the workload configuration parameters.

5. The method of claim 1, wherein:
the device obtains two intended state configuration files:
   a first intended state configuration file of the two intended state configuration files defining the control plane configuration, and
   a second intended state configuration file of the two intended state configuration files defining the workload configuration parameters.

6. The method of claim 1, wherein the one or more worker nodes comprise virtual machines (VMs) deployed on the hypervisor.

7. The method of claim 1, wherein the state of the control plane is physically separated from the state of the worker nodes.

8. A system comprising:
one or more processors; and
at least one memory, the one or more processors and the at least one memory configured to:
   boot a device running a hypervisor;
   in response to booting the device:
   automatically obtain, by the device, one or more intended state configuration files from a server external to the device, the one or more intended state configuration files defining a control plane configuration for providing services for at least deploying and managing a containerized workload and workload configuration parameters for the containerized workload;
   deploy, in a control plane, a control plane pod configured according to the control plane configuration;
   deploy one or more worker nodes based on the control plane configuration;
   deploy an infrastructure controller configured to manage a state of the control plane; and deploy a runtime controller for the one or more worker nodes configured to manage a state of the one or more worker nodes, wherein:

the infrastructure controller is deployed in the control plane;

the runtime controller is deployed in an extension plane; and the control plane and the extension plane are logically separated planes; and deploy one or more workloads identified by the workload configuration parameters on the one or more worker nodes.

9. The system of claim 8, wherein:

the one or more worker nodes are deployed in a worker plane; and the control plane and the worker plane are logically separated planes.

10. The system of claim 9, wherein the infrastructure controller is configured to manage the state of the control plane based on:

monitoring for changes to the control plane configuration; and updating the state of the control plane based on detecting a change to the control plane configuration when monitoring for the changes to the control plane configuration.

11. The system of claim 9, wherein the runtime controller is configured to manage the state of the one or more worker nodes based on:

monitoring for changes to the workload configuration parameters; and updating the state of the one or more worker nodes based on detecting a change to the workload configuration parameters when monitoring for the changes to the workload configuration parameters.

12. The system of claim 8, wherein:

the device obtains two intended state configuration files:

a first intended state configuration file of the two intended state configuration files defining the control plane configuration, and a second intended state configuration file of the two intended state configuration files defining the workload configuration parameters.

13. The system of claim 8, wherein the one or more worker nodes comprise virtual machines (VMs) deployed on the hypervisor.

14. A non-transitory computer-readable medium comprising instructions that, when executed by one or more processors of a computing system, cause the computing system to perform operations for automatically deploying a containerized workload on a hypervisor based device, the operations comprising:

booting the device running a hypervisor;

in response to booting the device:

automatically obtaining, by the device, one or more intended state configuration files from a server external to the device, the one or more intended state configuration files defining a control plane configuration for providing services for at least deploying and managing the containerized workload and workload configuration parameters for the containerized workload;

deploying, in a control plane, a control plane pod configured according to the control plane configuration;

deploying one or more worker nodes based on the control plane configuration;

deploying an infrastructure controller configured to manage a state of the control plane; and deploying a runtime controller for the one or more worker nodes configured to manage a state of the one or more worker nodes, wherein:

the infrastructure controller is deployed in the control plane;

the runtime controller is deployed in an extension plane; and the control plane and the extension plane are logically separated planes; and deploying one or more workloads identified by the workload configuration parameters on the one or more worker nodes.

15. The non-transitory computer-readable medium of claim 14, wherein:

the one or more worker nodes are deployed in a worker plane; and the control plane and the worker plane are logically separated planes.

16. The non-transitory computer-readable medium of claim 14, wherein the one or more worker nodes comprise virtual machines (VMs) deployed on the hypervisor.

17. The non-transitory computer-readable medium of claim 15, wherein the infrastructure controller is configured to manage the state of the control plane based on:

monitoring for changes to the control plane configuration; and updating the state of the control plane based on detecting a change to the control plane configuration when monitoring for the changes to the control plane configuration.

18. The non-transitory computer-readable medium of claim 15, wherein the runtime controller is configured to manage the state of the one or more worker nodes based on:

monitoring for changes to the workload configuration parameters; and updating the state of the one or more worker nodes based on detecting a change to the workload configuration parameters when monitoring for the changes to the workload configuration parameters.

19. The non-transitory computer-readable medium of claim 14, wherein:

the device obtains two intended state configuration files:

a first intended state configuration file of the two intended state configuration files defining the control plane configuration, and a second intended state configuration file of the two intended state configuration files defining the workload configuration parameters.

20. The non-transitory computer-readable medium of claim 14, wherein the state of the control plane is physically separated from the state of the worker nodes.

* * * * *